(12) United States Patent
Scott

(10) Patent No.: X9266
(45) Date of Patent: Nov. 26, 1835

(54) ASBESTOS, USE & APPLICATION OF, TO STOVES, GRATES, CRUCIBLES, &C.

(76) Inventor: John Scott

John Scott 724.

The schedule referred to in these Letters Patent and making part of the same containing a description in the words of the said John Scott himself of his improvement in the use & application of Asbestos, Be it known to all to whom it may concern that I John Scott of the City of Philadelphia in the Commonwealth of Pennsylvania have invented a new and useful improvement in the use and application of the inconsumable substance Asbestos in the construction of crucibles stove cylinders grate backs and jambs and furnaces:- Which improvement I describe as follows. Let the asbestos be mixed with mineral substances pulverized and moistened so as to form a thick Clay, such as isinglass, soap-stone, black-lead and fire clay and then let the mass be hardened by the action of heat or by gradual drying. It may be made of almost any size or shape and be especially useful for crucibles, stove-cylinders, grate-back or jambs and furnaces the Asbestos thus applied will contribute alike to the incombustibility firmness and durability of the article, The use and application of it in this manner and for these purposes, I claim as my own improvement. In testimony that the above is a true specification of my said improvements. I have hereunto set my hand and seal this ninth day of October A.D. 1835.

John Scott

Witnesses
William Milnory
Wm. J. Bealock (Not [illegible])

[illegible]